(12) United States Patent
Bargiel

(10) Patent No.: US 6,508,508 B1
(45) Date of Patent: Jan. 21, 2003

(54) ARMREST STORAGE

(75) Inventor: David A Bargiel, Troy, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/776,570

(22) Filed: Feb. 2, 2001

(51) Int. Cl.⁷ ............................................... A47C 7/62
(52) U.S. Cl. ............................. 297/188.16; 297/188.19
(58) Field of Search ........................ 297/188.14, 188.16, 297/188.01, 188.04, 188.07, 188.08, 188.09, 188.1, 188.13, 113, 112, 115, 411.32, 411.2, 248, 378.1, 217.3, 144, 145, 146, 188.19; 312/348.3

(56) References Cited

U.S. PATENT DOCUMENTS

| | | | | |
|---|---|---|---|---|
| 3,951,448 A | * | 4/1976 | Hawie | 297/188.19 X |
| 4,756,581 A | * | 7/1988 | Phillips | 312/348.3 X |
| 4,928,865 A | * | 5/1990 | Lorence et al. | 297/188.19 X |
| 5,096,152 A | * | 3/1992 | Christiansen et al. | 297/188.16 X |
| 5,516,191 A | * | 5/1996 | McKee | 297/145 X |
| 5,720,514 A | * | 2/1998 | Carlsen et al. | 297/188.1 |
| 5,752,740 A | | 5/1998 | Volkmann et al. | |
| 5,788,324 A | | 8/1998 | Shea et al. | 297/113 |
| 5,816,650 A | * | 10/1998 | Lucas, Jr. | 297/188.13 X |
| 5,848,820 A | | 12/1998 | Hecht et al. | |
| 5,853,220 A | | 12/1998 | Gulich et al. | |
| 5,934,732 A | | 8/1999 | Jakubiec | 296/65.01 |
| 5,947,554 A | | 9/1999 | Mashkevich | 297/115 |
| 6,027,164 A | | 2/2000 | Jakubiec et al. | |
| 6,139,096 A | * | 10/2000 | Anderson et al. | 297/144 X |
| 6,179,381 B1 | * | 1/2001 | Gavaert | 297/217.3 |
| 6,283,551 B1 | * | 9/2001 | Bergin | 297/188.14 X |

* cited by examiner

Primary Examiner—Peter M. Cuomo
Assistant Examiner—Stephen Vu
(74) Attorney, Agent, or Firm—Thomas A. Jurecko

(57) ABSTRACT

An automotive seat assembly for a compartmentalized pull-out armrest assembly includes a cover, an armrest storage compartment, and a seat cushion With an understorage compartment. The armrest storage compartment includes maneuverable dividers for changing the storage compartment as desired, a removable coin holder and a power supply. The armrest assembly can be positioned so as to provide yet a third seat.

12 Claims, 4 Drawing Sheets

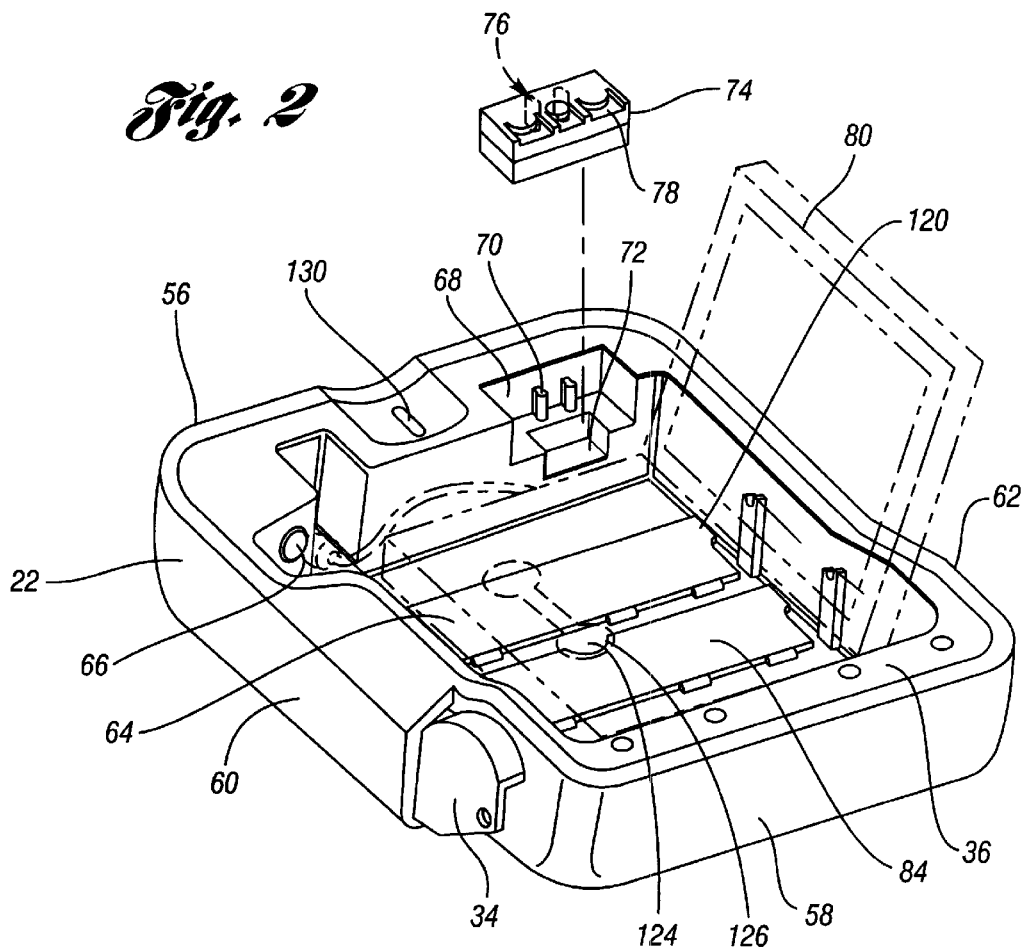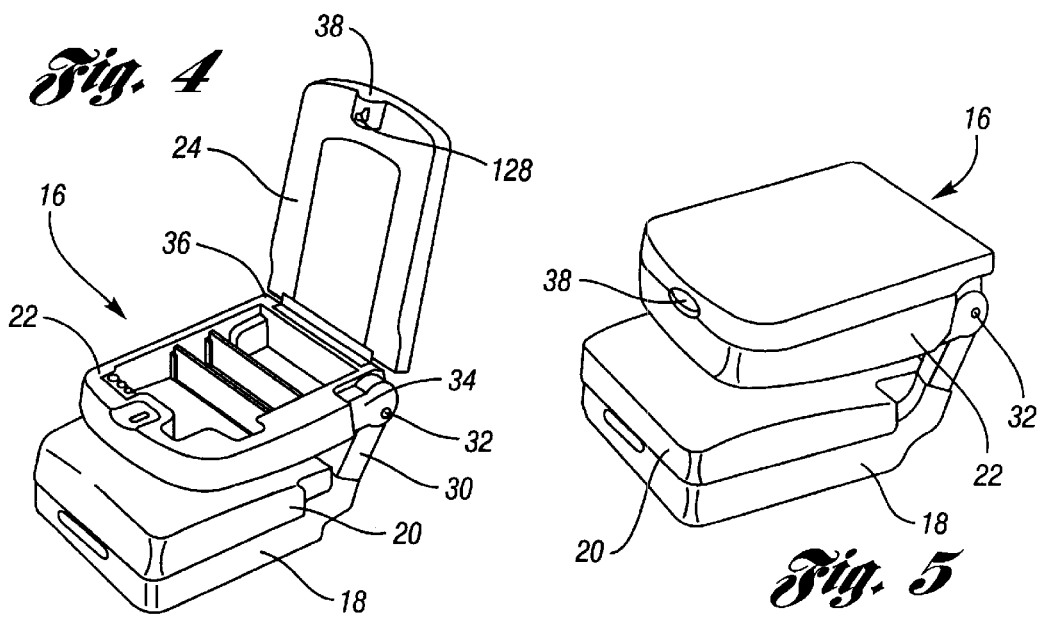

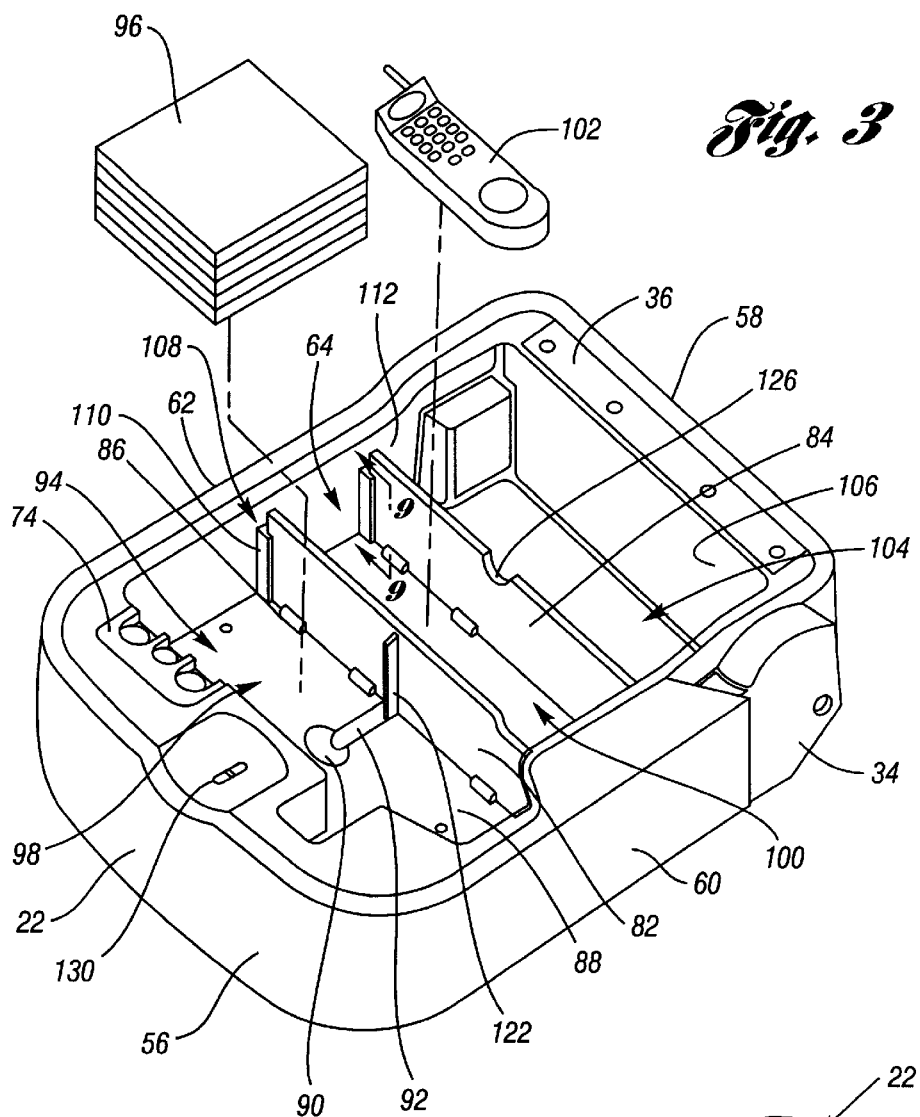
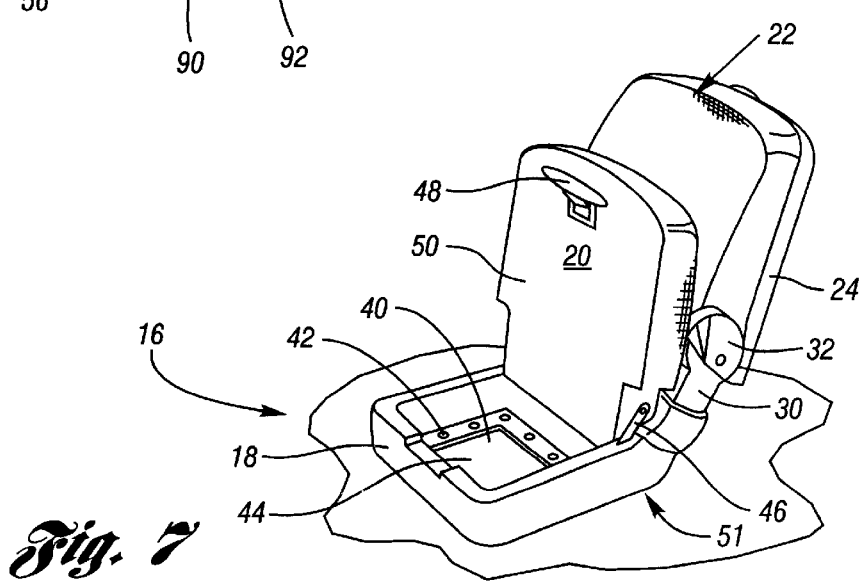

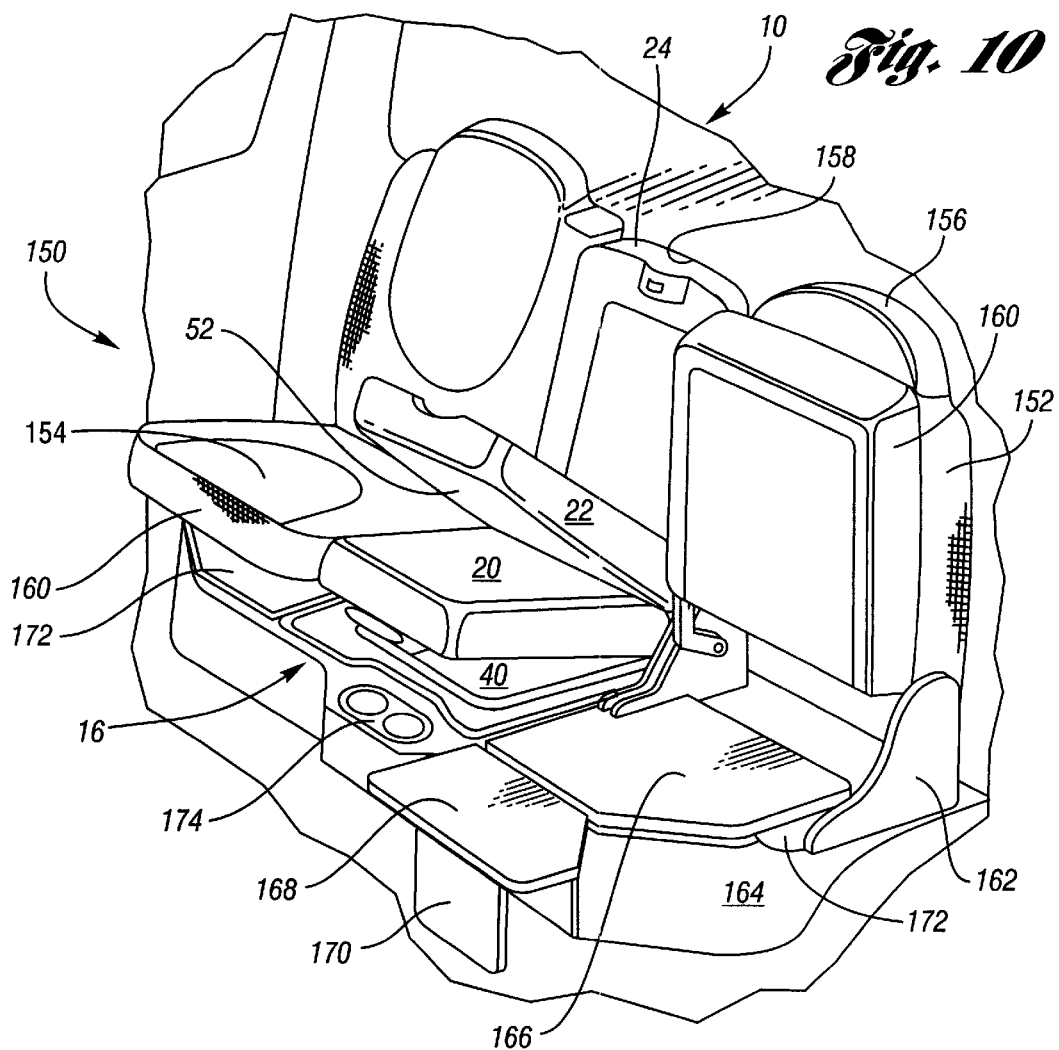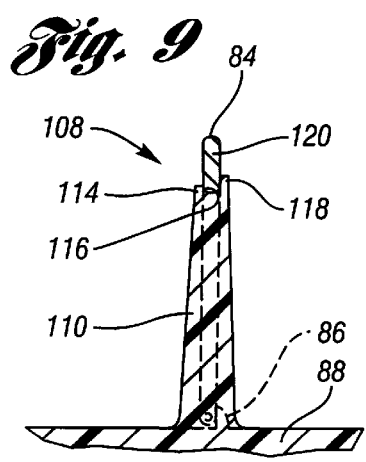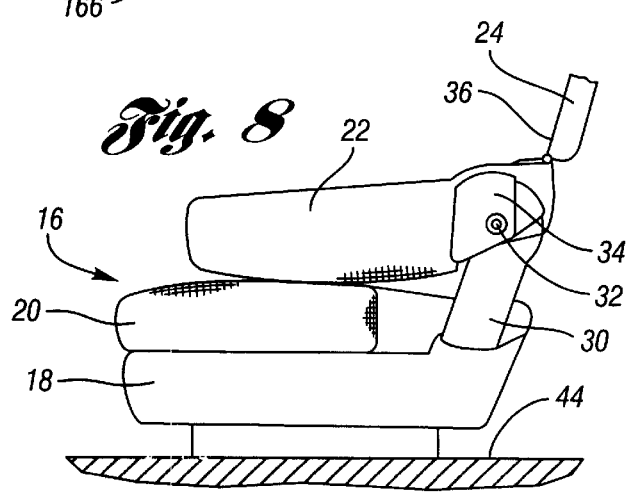

ARMREST STORAGE

BACKGROUND AND SUMMARY OF THE INVENTION

The present invention relates generally to seats for use in connection with automobiles and, more specifically, to a seat assembly employing a unique fold-out armrest assembly having a plurality of storage compartments.

Armrest assemblies are often used in the front seat and rear seat assemblies in automotive vehicles. Conventional armrests can be maneuvered to an upright position or, to a downward position for the occupant to lean on. Traditional seat assemblies utilize a 40/20/40 seat arrangement where the armrest takes up approximately 20% of the portion of the seat assembly. Other armrest assemblies include a storage compartment within the armrest that allows the occupant to store various articles.

One disadvantage of the traditional seat assembly having a built-in armrest is that it does not provide a comfortable place for yet a third occupant to sit while the vehicle is in operation.

Another disadvantage of traditional seats with built-in armrest assemblies is that they do not provide ample storage area nor do they maximize the potential for storing any articles below the seat where the armrest assembly is located.

Another disadvantage of traditional seat assemblies having built-in armrest assemblies is that the armrest storage compartment is not sufficiently organized to provide easy access to and a place for articles such as CDs, telephones, etc.

Another disadvantage of traditional armrest assemblies is that they do not provide power outlets for providing electricity to a cellphone, a laptop computer, or any other electrical device.

Another disadvantage of traditional armrest storage assemblies is that they do not provide compartment flexibility so as to allow the user to reconfigure the storage compartment as needed. It would be desirable to provide an armrest storage assembly that allows a user to easily reconfigure the storage compartment so as to allow the user to either store and use a laptop computer, or to provide individual compartments for smaller devices. It would also be desirable to provide an armrest storage compartment that allows a user to store her laptop computer within the armrest and cover it to hide it from people who are walking past the vehicle.

Accordingly, it is an object of the present invention to provide a seat assembly with an improved fold-out armrest that overcomes the disadvantages mentioned above.

It is another object of the present invention to provide an armrest that can be utilized in either a front seat assembly or in a rear seat assembly of a vehicle.

It is another object of the present invention to provide an armrest assembly that allows a user to reconfigure the storage compartment to accommodate the size of certain articles and yet, minimize the amount of shifting of those articles within the storage compartment when the vehicle is in operation.

It is yet another object of the present invention to provide an armrest assembly for an automotive vehicle that provides a storage area underneath the seat cushion of the armrest assembly as well as provides additional storage in the main compartment of the armrest assembly.

To overcome the aforementioned disadvantages, the present invention utilizes a seat assembly with a fold-out armrest comprised of a first seat cushion section having a storage area located underneath the cushion, a second seat cushion section and an armrest storage assembly located between the first and second seat cushion sections. The armrest storage assembly includes a seat cushion attached to a frame member that is operable to hinge upwardly so as to allow a user to access storage underneath the seat cushion. The armrest storage assembly further having a storage compartment that is hingably connected to the frame member. A cover member is closable to the storage compartment to create a sealed enclosure for articles. The storage compartment includes a pair of dividers extending transversely in a main compartment. The dividers are movable to an upright position so as to provide individual compartments or to a downward position, so as to make the main compartment a large open area. A laptop computer can fit within the main compartment when the dividers are in their down position. Finger recess grooves are located in the floor of the main compartment so as to allow the user to easily lift up the dividers and snap them into place with a catch mechanism that is formed as part of the main compartment. A removable coin holder is located adjacent the main compartment and provides a storage area for loose change. The main compartment further has a power receptacle for plugging in a laptop computer or a cellphone.

Other objects, features and advantages of the present invention will be readily appreciated as the same becomes better understood after reading the subsequent description when considered in connection with the accompanying drawings.

BRIEF DESCRIPTION OF THE DRAWINGS

FIG. 2 is a perspective view of the seat armrest storage compartment illustrating a laptop computer located within the storage compartment and a coin holder shown detached from the storage compartment.

FIG. 3 is a perspective view of the armrest compartment shown from a different angle where a different configuration of the main compartment is illustrated where divides et upright to form individual compartments.

FIG. 4 is a perspective view of the seat armrest assembly showing the base, cushion, armrest storage compartment and the cover.

FIG. 5 is a perspective view of the armrest assembly showing the armrest compartment closed and the assembly in the armrest position.

FIG. 7 is a perspective view of the armrest assembly with the seat cushion in the upright position so as to allow access to the understorage compartment.

FIG. 8 is a side elevational view of the armrest assembly with the cover open as shown in FIG. 4.

FIG. 9 is a sectional view taken in the direction of arrow 9—9 of FIG. 3 illustrating a divider latched into its upright position.

FIG. 10 is a perspective view of an alternative seat assembly for use in the present invention in connection with the middle or rear seat assembly of a vehicle.

DESCRIPTION OF THE PREFERRED EMBODIMENT(S)

Figure 1:
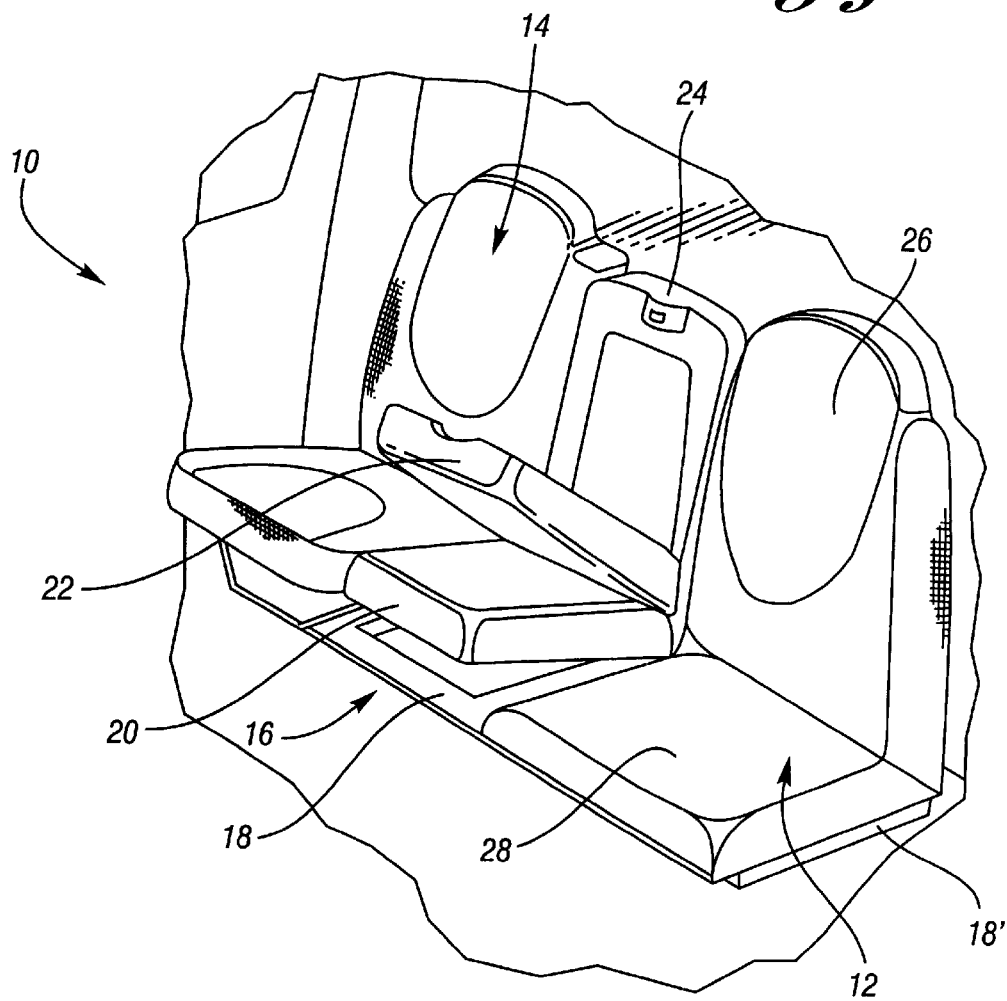
FIG. 1 is a perspective view of a front seat assembly of an automotive vehicle with a center fold-out armrest of the present invention.

Referring to FIG. 1, seat assembly 10 has a fold-up armrest and is illustrated according to the present invention. The seat assembly 10 includes a first seat cushion section 12 and a second seat cushion section 14 that each utilize a back cushion 26 and a bottom cushion 28. The bottom cushion sits upon a base 18 which, in turn, is secured to the floor of the vehicle. Disposed between the first and second seat cushion sections is an armrest storage assembly 16 which includes a base 18, a seat cushion 20, an armrest storage member or compartment 22, and a cover 24 that is operable to engage the member 22 and sealingly enclose the armrest storage member. It will be appreciated that the armrest storage assembly 16 can be utilized in other seat locations in a vehicle, for example, in the middle bench seat, or in a rear bench seat arrangement as shown in FIG. 10.

Figure 6:
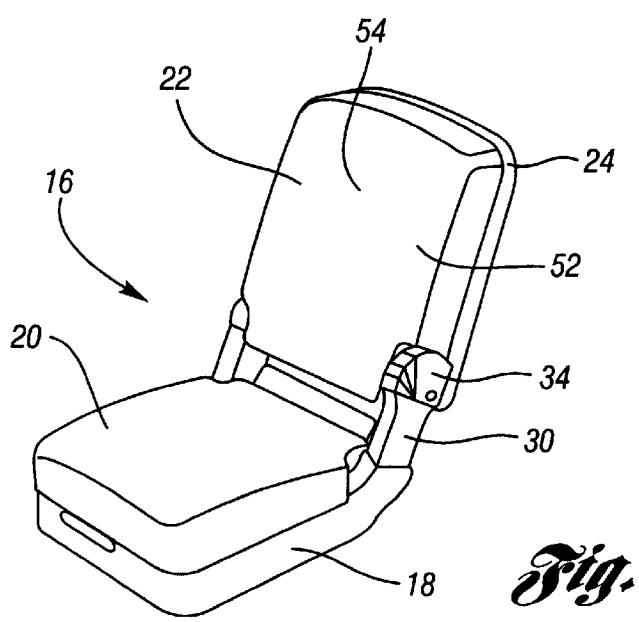
FIG. 6 is a perspective view of the armrest assembly with the armrest compartment closed and in an upright position so as to allow a user to sit in the seat.

The armrest storage assembly 16 can be maneuvered to a variety of positions as shown in FIGS. 4–8. This is accomplished in part because the base 18 has a rigid lower arm frame member 30 that pivots and is preferably made of structural steel in order to add rigidity to the assembly. Located at an upper end of the frame member 30 is a hinge 32 that pivotally connects the lower arm 30 to an upper arm 34. The upper arm 34 is preferably made of structural steel and is an integral part of the armrest storage member 22 as it provides rigidity to the storage member 22. This hinged arrangement allows the storage member 22 to articulate between an up position as shown in FIG. 6 or to a down or armrest position as shown in FIG. 5.

The cover 24 is pivotally connected to the storage member 22 by hinge member 36 that extends along a substantial portion of the back edge of the cover 24. The hinge allows the cover 24 to articulate between an open position as shown in FIG. 4, or to a closed position as shown in FIG. 5. A latch 38 allows the cover 24 and the storage member 22 to be securely closed. It will be appreciated that a lock could be provided with the latch so as to secure the contents in the storage member 22.

As shown in FIG. 7, the base 18 of the armrest storage assembly 16 includes a base storage compartment 40 located underneath the cushion 20 in order to provide additional storage area for the user. Fasteners 42 secure the base 18 to the floor 44 of the vehicle. A hinge mechanism 46 connectable between the base 18 and the cushion 20 allows the cushion to move to an upright position in order to allow access to storage compartment 40. A handle 48 is located on the bottom side 50 of the cushion 20 so as to allow the operator to easily lift up the cushion. Together the base storage compartment 40 and the armrest storage member 22 are a part of a common frame assembly 51 which include the base 18, the lower arm 30 and the upper arm 34. This creates a modular armrest assembly that is easy to install on the factory line. Also, this design provides for a seat armrest assembly having dual storage compartments, one being below the armrest and one being within the armrest.

With reference to FIG. 6, the front side 52 of the storage member 22 has soft cushion fabric 54 so as to provide a comfortable back rest cushion for the seat occupant. The seat cushion 20 also has soft fabric with the appropriate understructure so as to provide ample support for a seat occupant. This feature allows the modular armrest storage assembly 16 to act as a dual storage device, an armrest, and also a seat for a third occupant to ride on.

With reference to FIG. 2, the armrest storage member 22 includes a front wall 56, a rear wall 58, a first side wall 60, a second side wall 62 and a main compartment 64 that are preferably made of plastic. The aforementioned outer walls are finished so as to have an aesthetically pleasing exterior that matches the interior of the vehicle. The armrest storage member 22 has a structural member, the upper arm 34, and the outer side walls 60, 62, that envelop the arm 34. Together this creates a rigid storage compartment.

The main compartment 64 of the armrest member 22 has a power receptacle 66 located near the front wall 56 which is operable to provide power for a laptop computer, cellphone, or other electronic devices. Adjacent to the main compartment 64 is a coin holder receptacle 68 that has a pair of guides 70 and a finger recess 72. A removable coin holder 74 is rectangular-shaped and has a pair of slots 76 on its back side that mate with guides 70 so as to allow the coin holder 74 to be secured within the coin holder receptacle 68. The finger recess 72 allows a user to insert her fingers into the recess and pull up on the coin holder 74 so as to remove the coin holder 74 from the coin holder receptacle 68. The coin holder 74 includes a number of change receptacles 78 for storing change.

The main compartment 64 of the armrest storage member 22 has a sufficiently large compartment to receive, hold and store a computer 80. The operator can actually open up the computer and use the main compartment as a storage place or desk to work on while the computer is operating. When the computer is not operating, the user can turn off the computer, close the screen and close the storage compartment by closing the cover 24. This allows the computer to be stored in an inconspicuous safe spot in the automobile.

With reference to FIG. 3, the main compartment 64 can be divided into yet additional separate compartments as desired by the user. This unique feature is accomplished by providing a first divider 82 and a second divider 84, each of which are transversely located within the compartment and extend nearly the entire width of the compartment. Each divider moves about a plurality of hinges 86 that are integral with the floor 88 of the main compartment. The hinges allow the dividers 82 and 84 to fold to a downward position as shown in FIG. 2. The floor 88 has a finger recess 90 and a longitudinally extending partition clearance groove 92. When the dividers are in their upright position as shown in FIG. 3, a first compartment 94 is created which provides for the insertion of CDs 96 into their own individual compartment 98. Further, a phone compartment 100 extends between the first and second dividers and provides a storage compartment for a phone 102. A third auxiliary compartment 104 extends between the second divider 84 and a back wall 106. Thus, the dividers allow a series of individual compartments 94, 100 and 104, to be easily created by the operator as desired.

The main compartment further has a latch means 108 that is shown in FIGS. 3 and 9. The latch means 108 is comprised of an upwardly extending stop 110 that is integral with the internal side walls 112 of the main compartment 64. The stop 110 has a latch or catch design which includes a lower forward wall 114, a transversely extending groove 116 and an upper rearward wall 118. Together these components provide a latch mechanism for a flange 120 to rest in so as to secure dividers 82, 84 in an upright position. There is sufficient play between the dividers 82, 84 and their hinges 86 to allow vertical upward and outward movement so as to disengage the flange 120 from the groove 116. Further, the dividers 82, 84 are preferably made of a flexible material, such as plastic, so as to provide slight play in the latch means 108.

A partition member 122 extends across the width of the divider 82 and is integral therewith so as to provide a guide for the CDs 96 within the CD compartment 98. The partition also provides structured support for the divider 82. When the divider 82 is moved to a downward position, the partition 122 is recessed within the partition clearance groove 92 so as to allow the divider to lay substantially flat and not cause any obstructions in the main compartment 64. As shown in FIG. 2, the dividers 82 and 84 are shown in their downward position so as to create a single large main compartment that is operable to hold large articles such as a computer 80. A separate finger groove 124 is integral with the floor 88 so as to provide an access for the user to lift up the second divider 84. The second divider 84 has a recess 126 along the upper edge of the divider 84 and the recess allows the operator to penetrate the finger groove 124 and lift up the divider 84. To snap the divider 84 into its upright vertical position, the operator pulls the divider to its upright position until the flange 120 snaps into groove 116.

The armrest cover 24 has a latch 38 with a male member 128 that is operable to engage a catch plate 130 that is located in the front of the armrest storage member 22.

With reference now to FIG. 10, an alternative seat assembly 150 is illustrated that utilizes the present invention. This alternative seat assembly 150 utilizes the armrest storage assembly 16 as disclosed above. However, this unique seat assembly utilizes the armrest assembly 16 in connection with a middle or rear seat of an automotive vehicle. The alternative seat assembly includes a first passenger seat 152, and a second passenger seat 154 in connection with the armrest assembly 16. A one-piece integral back cushion 156 extends across the width of the seat assembly 150 and has a nestable recess 158 that is operable to receive the cover 24 and the armrest storage compartment 22. When the cover 24 and the armrest storage compartment 22 are in their upright position, the front surface 52 of the armrest storage compartment 22 provides a backrest for the seat occupant.

The first passenger seat 152 includes a foldable seat cushion 160 that is hingably connected by hinge 162 to a base 164 of the seat assembly. A collapsible workstation 166 has a fold-out platform 168 and a support leg 170. This provides a work surface for an occupant to place articles on. When the collapsible workstation 166 is no longer being used, it can be folded up and located within compartment 172 that is located beneath seat cushion 160 and within the base 164.

The second passenger seat 154 also includes a hingable seat cushion 160 and a separate storage compartment 172. FIG. 10 illustrates the second passenger seat 154 with its cushion slightly raised so as to allow the occupant to gain access to compartment 172. It will be appreciated that a collapsible workstation 166 could also be used in connection with the second passenger seat 154.

An integral cup holder 174 is part of the base 164 and is located in front of the armrest seat assembly 16. It will be appreciated that the base storage compartment 40 could be lined to have a cooler so as to provide soft drinks for the integral cup holder 174. The remaining components of the armrest assembly 16 are the same as previously described, therefore no further discussion is necessary.

The present invention has been described in an illustrated manner. It is to be understood that the terminology which has been used is intended to be in the nature of words and description rather than of any limitation whatsoever. It will be appreciated that alternative modifications and variations of the present invention are possible in light of the present disclosure. Therefore, within the scope of the pending claims, the present invention may be practiced other than as specifically described.

What is claimed is:

1. A seat assembly with a fold-out armrest comprising:
a first seat cushion section;
a second seat cushion section spaced apart from the first seat cushion section; and
a compartmentalized armset storage assembly having a seat cushion located between the first and second seat cushion sections, an armrest storage compartment and a cover hingably connected to the armrest storage compartment, the armrest storage compartment includes a CD compartment and a phone compartment separated by a first divider, a miscellaneous compartment separated from the phone compartment by a second divider, a latch mechanism for securing each divider to an upright position, a power outlet located within the storage compartment, and a coin holder removable from one of the compartments, wherein the armrest storage compartment and the cover are moveable to an upright position and able to recess between the first and second seat cushions.

2. The seat assembly as claimed in claim 1, wherein each divider is foldable to a downward position to create a computer space.

3. The seat assembly as claimed in claim 1, wherein the compartmentalized armrest storage assembly filter comprises a second storage area that is located under the storage assembly seat cushion.

4. The set assembly as claimed in claim 1, wherein the armrest storage compartment includes a groove in a floor of one of the compartments.

5. The seat assembly as claimed in claim 1, wherein the armrest storage compartment includes a partition located on one of said dividers.

6. The seat assembly as claimed in claim 1, further comprising a finger recess cavity in the armrest storage compartment to assist in a removal of the coin holder.

7. The seat assembly as claimed in claim 1, further comprising a cup holder.

8. The seat assembly as claimed in claim 1, further comprising a unitary back rest extending across the seat assembly with a recess located in a central part of the back rest for locating the armrest cover and armrest storage member to an upright position.

9. The seat assembly as claimed in claim 1, further comprising at least one of said dividers hinged to a floor of the storage compartment, the at least one of said dividers having a flange that engages a catch.

10. A fold-out armrest assembly comprising:
a base cushion secured to a frame member;
an armrest storage compartment hingably connected to the frame member, the armrest storage compartment including a main compartment with walls, a floor and a latch on at least one of the walls, the main compartment can be partitioned to create a plurality of individual compartments, a plurality of foldable dividers hinged to the floor, each divider having a tab that engages the latch to secure the divider in an upright position; and
a cover hinged to the armrest storage compartment.

11. The armrest assembly as claimed in claim 10 further comprising a power outlet located within the armrest storage compartment.

12. The armrest assembly as claimed in claim 10 further comprising a storage area located underneath the base cushion, the base cushion being movable relative to the frame member so as to provide access to the storage area.

* * * * *